(No Model.) 2 Sheets—Sheet 1.

A. SPRINGER & W. KENT.
GRAIN METER.

No. 365,877. Patented July 5, 1887.

Attest.
C. W. Bogart.
C. D. Kerr.

Inventor.
William Kent
Alfred Springer
By Kettlewell, Atty.

(No Model.) 2 Sheets—Sheet 2.
A. SPRINGER & W. KENT.
GRAIN METER.
No. 365,877. Patented July 5, 1887.
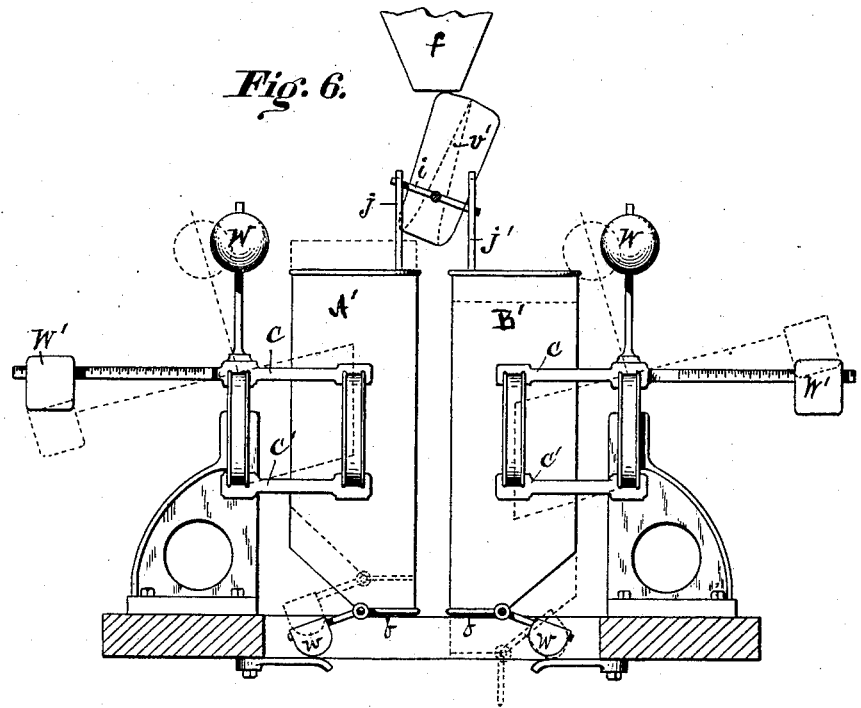
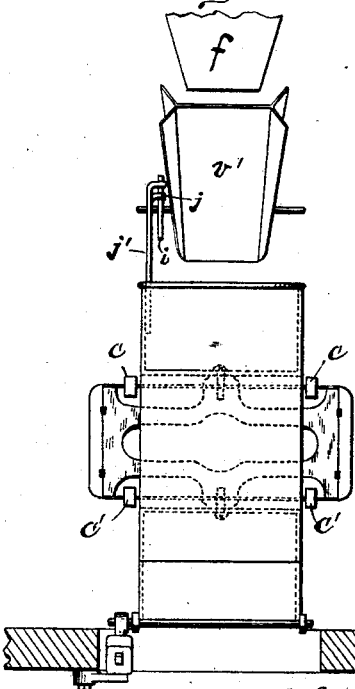
Attest.
C. D. Kerr.
E. L. Kerr.
Inventor.
William Kent
Alfred Springer
By Kett Hosea, Atty.

UNITED STATES PATENT OFFICE.

ALFRED SPRINGER, OF CINCINNATI, OHIO, AND WILLIAM KENT, OF JERSEY CITY, NEW JERSEY.

GRAIN-METER.

SPECIFICATION forming part of Letters Patent No. 365,877, dated July 5, 1887.

Application filed November 24, 1886. Serial No. 219,842. (No model.)

*To all whom it may concern:*

Be it known that we, ALFRED SPRINGER and WILLIAM KENT, citizens of the United States, residing at Cincinnati, Ohio, and Jersey City, New Jersey, respectively, have invented new and useful Improvements in Grain-Meters, of which the following is a specification.

Our invention relates to grain-meters, its object being to provide a simple, inexpensive, durable, and accurate device for measuring grain delivered continuously to the apparatus; and it consists, primarily, in a construction adapted to the employment of supporting-pivots acting torsionally and without the friction, wear, and deterioration incident to pivots involving a bearing-friction, such as the ordinary "knife-edges," and in which the weight of the apparatus and its load may be distributed over several pivotal bearings instead of being confined to one.

The leading operative principle of our invention includes as an adjunct to the action of the torsion-pivots acting by molecular displacement within the limits of torsional elasticity a scale action in which the center of gravity is maintained above the center of beam oscillation by a weight rigidly mounted upon the beam and oscillated by the variations of load alternating at the ends of the beam on opposite sides of the vertical plane of the axis of the beam rotation.

Our invention may be said, then, to consist in an automatic grain-meter embodying these operative principles, and in certain constructive features by which they are embodied in such convenient form as to secure the desirable results first mentioned, as hereinafter more fully set forth.

Mechanism embodying our invention is illustrated in the accompanying drawings, forming part of this specification, in which we have shown the application of the principles indicated to a double-acting grain-meter having two boxes or buckets mounted upon a centrally-pivoted balance-beam, and also to a single-acting meter having one box or bucket mounted upon a "steelyard" beam.

Figure 1:
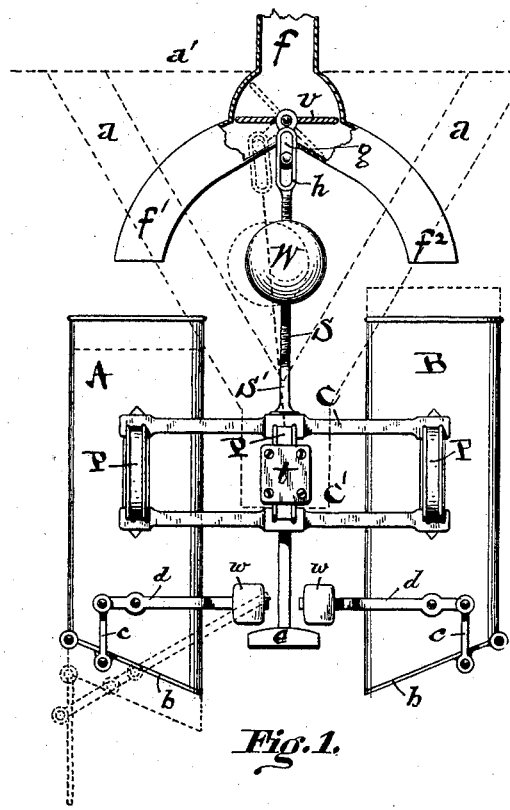
Figure 2:
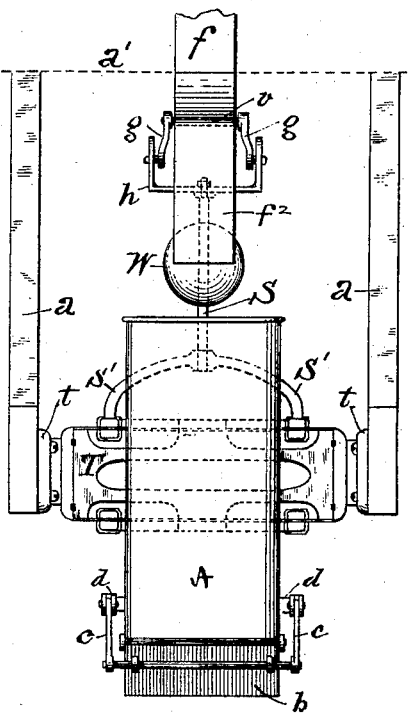
Figure 4:
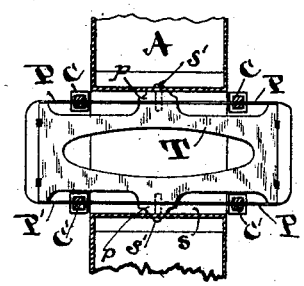
Figure 3:
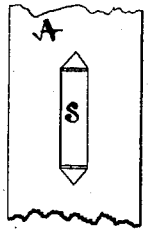
Figure 5:
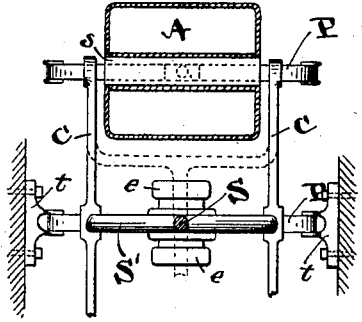

Figure 1 is a side elevation complete of a "double" grain-meter as above explained; Fig. 2, an end elevation of the same; Fig. 3, a detail end view of the aperture through the grain-bucket; Fig. 4, a vertical cross-section of one of the buckets, showing the mode of mounting upon the torsion-pivot frame; Fig. 5, a plan or horizontal cross-section of a bucket, showing its relation to the beam, with an alternative form of beam-connection indicated by dotted lines; Fig. 6, a side elevation of two "single" meters embodying the same constructive and operative principles, and Fig. 7 an end view of the same.

Referring now to the drawings, A and B designate two grain-buckets hung pivotally upon the outer ends of duplicate balance-beams C C', said beams being supported upon fulcra in a common vertical plane at their respective centers. Centrally above and in the vertical plane of the supporting-fulcrum a weight, W, is carried adjustably upon a standard, S, rigidly secured to the balance-beam C. The position of the weights maintains the center of gravity constantly above the axis of oscillation of the scale structure, and its statical moment, when oscillated to ultimate positions alternately at opposite sides of the perpendicular, keeps the scale structure depressed at one side or the other until the accumulating weight of grain delivered to the receptacle at the raised side overcomes said statical moment and shifts the center of gravity to and depresses the scale apparatus at the opposite side of the perpendicular, where the statical moment of the weight holds the apparatus depressed until the operations above described reverse the action, the grain being discharged at each depression. Thus is produced a series of alternating registrable movements in which the weight of grain required at each oscillation to overcome the statical moment of the weight W is determined and registered.

The structural features of the apparatus are as follows: As shown in Figs. 1 to 5, the buckets are mounted between and upheld at the termini of four balance-beams, C C and C' C', arranged in pairs, having their fulcrum and terminal pivots equidistant each from each and arranged respectively in common vertical planes. The pivots in each case consist of a strip, P, of elastic metal held externally around a "torsion" or "tension" frame, T. This consists, substantially, of a rectangular frame of metal, around which the strip or pivot P is held in tension, the sides being recessed to receive and permit the oscillating movements of the beams. Each such frame has a single continuous pivot-strip tensioned upon it, clamped midway of its length at each side of the frame by blocks $p$ against the frame, thus dividing the pivot upon each frame into four separate portions, each having its independent torsional function. This construction is clearly indicated in Fig. 4 for the terminal pivots of the beams and the connecting-frame, and in Figs. 2 and 5 for the fulcrum-pivots and the supporting-frame. The supporting-frame T, for the fulcrum-pivots, is extended at the ends into flanged brackets $t$, which enable the apparatus to be secured to and upheld upon supports $a\ a$, extending, for example, from a ceiling or floor, $a'$. The bucket A (or, similarly, B) rests upon and is secured to the torsion-frame T (which connects the terminal pivots of the beams) by means of the block $p$, which, besides constituting the clamp for the pivotal strip, also forms a resting support for the bucket.

To accommodate the tension frame and give an approximately central bearing and connection for the bucket, we provide a lateral aperture, $s$, through the bucket from side to side, suitably walled in, through which the frame T is passed and secured to the bucket by screws $s'$, respectively passed through the upper and lower walls of the aperture $s$ centrally into or through the blocks $p$, thus securing the bucket to the tension-frame. The space, $s$, thus walled in through the bucket is preferably provided with a "hip-roof," to prevent lodgment of grain thereon, as indicated in Fig. 3. The standard S, where the beams C are used in pairs, as shown, is bifurcated below into arms S', carried to and giving support upon each beam of the pair, and the weight W is rendered adjustable by threading the weight upon the standard or carrying the weight between nuts threaded upon the standard. The buckets A B are each provided below with a hinged bottom, $b$, upheld closed by suspending-links $c\ c$, connected to the bifurcated ends of a lever pivoted at the sides of the bucket and carrying a weight, $w$, at its rear end. When the buckets are at or above the medial position shown in Fig. 1, the weights $w$ operate to hold the hinged bottoms $b$ closed against the weight of grain; but when the buckets descend below that point the weights $w$ are upheld upon a foot-piece, $e$, suspended below the balance structure in the descending path of said weights, and thus open the bucket-bottoms $b$ and allow the grain to escape.

To shunt the stream of grain alternately into the proper buckets, a valve, $v$, is provided, actuated by the movements of the apparatus. A preferred form of valve (shown in the drawings) consists of a wing-valve centrally pivoted, operating in the grain-conduit, formed as shown. In this the grain-conduit $f$ is bifurcated into two delivery-spouts, $f'\ f^2$, each discharging into its proper bucket. The valve $v$ is pivoted at the junction angle of the conduit $f$ and its bifurcations, the containing chamber being cylindrically curved above to the arc of movement of the valve, so that when it opens into one delivery-spout it shall remain wholly closed to the other, and the alternating openings of the valve shall be separated by a period of total closure of both. This arrangement is preferable, since it enables the apparatus to be adjusted to exact measures and prevents the falling of extra grain into the descending bucket, which is often a source of error in the action of meters of this class. The valve thus arranged is operated by a yoke-connection with the upper extremity of the standard S. The termini of the valve-pivot are provided with cranks $g$, engaging a slotted yoke-piece, $h$, attached to the standard, which thereby, by its oscillation, operates the valve $v$.

Thus constructed, the operation of the apparatus is as follows: The weight W is sufficient to overbalance the pivotal resistance and to keep the apparatus tilted, which operation elevates one bucket—for example, A—and depresses the other, B, the weight being then deflected to the right of its normal perpendicular. In this position of the apparatus the valve $v$ is open to delivery-spout $f'$, emptying into bucket A. As the bucket fills with grain it descends, overcomes the statical moment of the weight W, and as the weight W passes the perpendicular of its axis of oscillation its statical moment is transferred to the descending bucket A, causing its hinged bottom $b$ to open and discharge the grain, and operating valve $v$ to deliver grain into the bucket B, when the same operations recur with the bucket B. It will be readily seen, from the manner of mounting the buckets upon the parallel beams C and C', that the buckets remain vertical at all times. The device constructed as shown in Figs. 6 and 7 is in all essential respects the same, excepting that. but one grain-box—for example, A'—is used, and the opposite or free ends of the upper beams, C, are extended as a single arm and provided with a balance-weight, W'. In this case the corresponding extension of the beams C' may be omitted, leaving only that portion connecting the fulcrum-pivot with the terminal frame at the box end and acting as "radius-arms." In these figures we have shown the apparatus upheld by an ordinary pedestal-support from a horizontal base below; but this, also, is not material. For convenience of illustration we have shown two specimens of such apparatus side by side, to indicate a use in which the same descending stream of grain may be shunted through two independent systems of apparatus and measured in wholly different units, each apparatus in this case being independently adjustable, as will be obvious without particular description. The weight W' in such case is proportioned to the weight W, so as to be just sufficient to overcome the statical moment of the latter when at the box side of its normal perpendicular and keep the apparatus normally, when empty, in the position indicated by dotted lines at the left-hand apparatus in Fig. 6. We have shown, also, for such double use of the steel-yard apparatus, a modified arrangement of the valve, making it a top-heavy deflecting gate or spout, $v'$, pivoted below the grain-conduit $f$, having a cross-arm, $i$, upon its extended pivot, engaged alternately by fingers $j$ and $j'$ upon the boxes A' B' to throw the gate $v'$ over its center and reverse its delivery, as indicated in Fig. 6. The weights $w$ in this apparatus are shown as attached directly to a rear extension of the hinged bottom $b$, and the same arrangement is applicable to the apparatus first described, either by changing the position of the stop $e$ to correspond or changing the hinge-line of the pivoted bottom.

In Fig. 5 we have indicated by dotted lines the feasibility of employing single beams C or C' with bifurcated ends embracing the grain-buckets. In such case the fulcrum tension-frame will require but two pivots, one above and one below, and their central clamping-blocks, $p$, may then be omitted.

It is to be understood that suitable registering apparatus is to be attached to the device to record the number of oscillations, and the amount of grain passing through thus ascertained; but, as many well-known forms of such apparatus are in common use, we have not thought it necessary to specify more particularly on this point.

In this invention we do not limit ourselves exclusively to "torsion-pivots," as it will be apparent that an operative and reasonably accurate apparatus could be made employing ordinary journals or knife-edge bearings, which would realize many of the benefits attained by us; but the use of the torsion pivot is undoubtedly preferable. Neither do we limit ourselves to the precise mechanical construction in other respects, as shown, as the main principles of our invention are susceptible of embodiment with various mechanical modifications.

We claim as our invention and desire to secure by Letters Patent of the United States—

1. The combination, in a grain-meter, of two parallel oscillating beams fulcrumed in a common vertical plane, a rigid vertical connection between their terminal pivots, a grain-bucket secured to the said rigid connection, a corresponding bucket or weight at the opposite terminal, and an overbalancing-weight carried above the fulcrum-pivot and deflected from side to side of the vertical plane of the axis of beam rotation, as and for the purpose set forth.

2. The combination, in a grain-meter of the character described, of a valve-controlled grain-conduit, two self-discharging buckets carried upon rigid terminal pivot-connections of two parallel balance-beams fulcrumed in a common vertical plane, and a vertical projection of the upper balance-beam, carrying an overbalancing-weight and actuating the distributing-valve, substantially as set forth.

3. An automatic grain-meter embodying in its structure the combination of a grain-bucket with a substantially-rectangular frame, having a band or strip of elastic metal held in tension around the same, said strip constituting the terminal pivots of a double-beam structure fulcrumed in a common vertical plane, and said frame constituting a rigid connection between said pivots, substantially as set forth.

4. An automatic grain-meter embodying, in combination, two balance-beams fulcrumed torsionally in a common vertical plane, a rigid connection between the terminal torsional pivots of said beams, two self-discharging grain-buckets mounted upon said rigid connecting-frame, and an overbalancing-weight carried adjustably upon a vertical standard rising rigidly from the upper beam in the vertical plane of its fulcrum, substantially as set forth.

5. The combination of the central tension-frame provided with lugs for supporting attachment, the terminal tension-frames, the pivot bands or strips, the balance-beams, the self-discharging buckets provided with central walled apertures for admitting and resting upon the terminal tension-frames, and the overbalancing weight and standard, substantially as set forth.

6. In a grain-meter of the character described, the combination and arrangement of the conduit $f$, the delivery-spouts $f'$ $f^2$, the pivoted valve $v$, and the curved sides of the conduit above the valve, substantially as set forth.

In testimony whereof we have hereunto set our hands in the presence of two subscribing witnesses.

ALFRED SPRINGER.
WILLIAM KENT.

Witnesses for Alfred Springer:
L. M. HOSEA,
C. D. KERR.

Witnesses for William Kent:
J. C. JULIUS LANGBEIN,
EMIL REINE.